United States Patent
Zeng et al.

(10) Patent No.: US 10,891,009 B2
(45) Date of Patent: Jan. 12, 2021

(54) TOUCH SUBSTRATE, METHOD FOR MANUFACTURING THE SAME, AND TOUCH CONTROL DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Ting Zeng, Beijing (CN); Ming Zhang, Beijing (CN); Haifeng Hu, Beijing (CN); Fuwei Zou, Beijing (CN); Shichao Fei, Beijing (CN); Xing Tang, Beijing (CN)

(73) Assignee: BOE TECHNOLOGY GROUP CO., LTD.

( * ) Notice: Subject to any disclaimer, the term of this patent is extended or adjusted under 35 U.S.C. 154(b) by 0 days.

(21) Appl. No.: 16/331,801

(22) PCT Filed: May 31, 2018

(86) PCT No.: PCT/CN2018/089214
§ 371 (c)(1),
(2) Date: Mar. 8, 2019

(87) PCT Pub. No.: WO2019/041929
PCT Pub. Date: Mar. 7, 2019

(65) Prior Publication Data
US 2019/0369769 A1    Dec. 5, 2019

(30) Foreign Application Priority Data

Aug. 29, 2017  (CN) .......................... 2017 1 0754988

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC ...................................................... G06F 3/044
See application file for complete search history.

(56) References Cited

U.S. PATENT DOCUMENTS

2005/0037240 A1* 2/2005 Haoto ................. C23C 14/0676
428/698
2006/0250084 A1* 11/2006 Cok .................... H01L 51/5234
313/512

(Continued)

FOREIGN PATENT DOCUMENTS

| CN | 104267859 A | 1/2015 |
| CN | 104750284 A | 7/2015 |

(Continued)

OTHER PUBLICATIONS

First Office Action for Chinese Application No. 201710754988.4, dated Nov. 22, 2018, 9 Pages.

(Continued)

*Primary Examiner* — Ariel A Balaoing
(74) *Attorney, Agent, or Firm* — Brooks Kushman P.C.

(57) ABSTRACT

A touch substrate, a method for manufacturing the same and a touch control device are provided. The touch substrate includes a touch region, and a wiring region arranged adjacent to the touch region and covered with a protection structure. The protection structure includes at least two organic layers and at least two inorganic layers arranged alternately one on another.

16 Claims, 3 Drawing Sheets

(56) References Cited

U.S. PATENT DOCUMENTS

| | | | |
|---|---|---|---|
| 2010/0315353 A1 | 12/2010 | Huang et al. | |
| 2011/0156578 A1* | 6/2011 | Jeon | H01L 51/5253 |
| | | | 313/506 |
| 2013/0002572 A1 | 1/2013 | Jin et al. | |
| 2016/0077628 A1 | 3/2016 | Liu | |
| 2016/0306472 A1 | 10/2016 | Park et al. | |
| 2016/0364053 A1 | 12/2016 | Lee et al. | |
| 2017/0003800 A1 | 1/2017 | Zhu | |
| 2017/0090223 A1* | 3/2017 | Kim | G02F 1/1309 |
| 2018/0358413 A1* | 12/2018 | Lee | G06F 3/044 |

FOREIGN PATENT DOCUMENTS

| | | |
|---|---|---|
| CN | 106249936 A | 12/2016 |
| CN | 106449707 A | 2/2017 |
| CN | 206193735 U | 5/2017 |
| CN | 107584819 A | 1/2018 |
| JP | 2017035829 A | 2/2017 |
| TW | 200505270 A | 2/2005 |

OTHER PUBLICATIONS

Second Office Action for Chinese Application No. 201710754988.4, dated Mar. 19, 2019, 6 Pages.

International Search Report and Written Opinion for Application No. PCT/CN2018/089214, dated Aug. 3, 2018, 11 Pages.

Extended European Search Report for European Patent Application No. 18849413.2, dated May 8, 2020, 8 Pages.

* cited by examiner

Fig. 3 forming a protection structure covering a wiring region of the touch substrate, and the protection structure includes at least two organic layers and at least two inorganic layers arranged alternately one on another — 401

TOUCH SUBSTRATE, METHOD FOR MANUFACTURING THE SAME, AND TOUCH CONTROL DEVICE

CROSS-REFERENCE TO RELATED APPLICATION APPLICATIONS

This application is the U.S. national phase of PCT Application No. PCT/CN2018/089214 filed on May 31, 2018, which claims priority to Chinese Patent Application No. 201710754988.4 filed on Aug. 29, 2017, which are incorporated herein by reference in their entireties.

TECHNICAL FIELD

The present disclosure relates to the field of touch control technology, in particular to a touch substrate, a method for manufacturing the same, and a touch control device.

BACKGROUND

Along with the development of the touch control technology, vehicle-mounted touch control devices have become more and more popular to people. Generally, touch control products have been adopted for a vehicle-mounted master console and a rear-seat center console, so as to improve user experience for drivers and passengers. For an early-stage vehicle-mounted touch control device, usually a resistive touch screen is adopted. With the development of the capacitive touch control technology, a product based on a Glass-Glass (GG)/One Glass Solution (OGS) technology has excellent touch sensitivity and excellent user experience, and therefore, the GG/OGS-based technology has become a follow-up developing trend for the vehicle-mounted touch control technology.

SUMMARY

In a first aspect, the present disclosure provides a touch substrate, including a touch region, and a wiring region arranged adjacent to the touch region and covered by a protection structure. The protection structure includes at least two organic layers and at least two inorganic layers arranged alternately one on another.

In some optional embodiments, the protection structure includes a first organic layer, a first inorganic layer, a second organic layer and a second inorganic layer that are sequentially arranged one on another.

In some optional embodiments, the touch substrate includes, in the wiring region: a planarization layer; a metallic wire arranged on the planarization layer; the first inorganic layer covering the metallic wire; the first organic layer covering the first inorganic layer; the second inorganic layer covering the first organic layer; and the second organic layer covering the second inorganic layer.

In some optional embodiments, the touch substrate includes, in the wiring region: a metallic wire; the first organic layer covering the metallic wire; the first inorganic layer covering the first organic layer; the second organic layer covering the first inorganic layer; and the second inorganic layer covering the second organic layer.

In some optional embodiments, the first inorganic layer and the second inorganic layer are made of a same material, and the first organic layer and the second organic layer are made of a same material.

In some optional embodiments, each inorganic layer is made of $SiN_xO_y$.

In some optional embodiments, each inorganic layer has a thickness of 350 to 550 Å.

In some optional embodiments, each organic layer is made of a transparent material.

In some optional embodiments, each organic layer has a thickness of 10000 to 30000 Å.

In some optional embodiments, each inorganic layer has a refractive index of 1.60 to 1.75.

In a second aspect, the present disclosure further provides a method for manufacturing a touch substrate, including: forming a protection structure covering a wiring region of the touch substrate. The protection structure includes at least two organic layers and at least two inorganic layers arranged alternately one on another.

In some optional embodiments, the forming the protection structure includes: forming a first organic layer, a first inorganic layer, a second organic layer and a second inorganic layer sequentially in the wiring region.

In some optional embodiments, the method further includes: forming a planarization layer; forming a metallic wire on the planarization layer; forming the first inorganic layer covering the metallic wire; forming the first organic layer covering the first inorganic layer; forming the second inorganic layer covering the first organic layer; and forming the second organic layer covering the second inorganic layer.

In some optional embodiments, the method further includes: forming a metallic wire; forming the first organic layer covering the metallic wire; forming the first inorganic layer covering the first organic layer; forming the second organic layer covering the first inorganic layer; and forming the second inorganic layer covering the second organic layer.

In a third aspect, the present disclosure further provides a touch control device including the above-mentioned touch substrate.

In some optional embodiments, the touch control device is a vehicle-mounted touch control device.

BRIEF DESCRIPTION OF THE DRAWINGS

In order to illustrate technical solutions of the present disclosure or the related art in a clearer manner, the drawings needed to be used in the present disclosure or in the related art will be described below briefly. Obviously, the drawings described below merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

A vehicle-mounted touch control product needs to operate in a high-temperature and high-humidity environment for a long time period. Currently, in a general standard, the touch control product needs to operate in the high-temperature and high-humidity environment for at least 1000 hours, even at least 1500 hours for some high-end vehicles. However, a wiring region of a conventional touch control product has insufficient resistance to high temperature and high humidity. After the touch control product has operated in the high-temperature and high-humidity environment for 1200 hours, metallic wires in the wiring region may be corroded, thereby the performance of the touch control product may be adversely affected, i.e., it is impossible for the touch control product to meet the requirements on the resistance to high temperature and high humidity.

Figure 1:
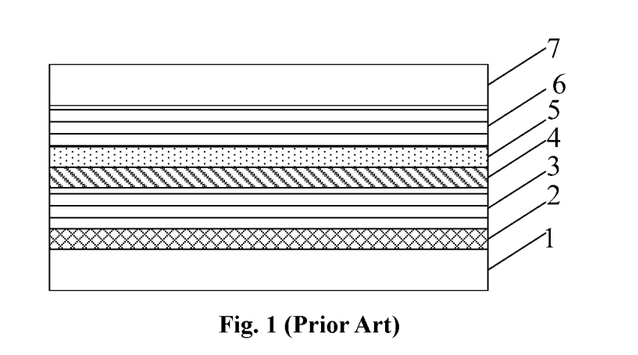
FIG. 1 is a schematic structural diagram showing a wiring region of a touch substrate in the related art.

FIG. 1 is a schematic structural diagram of a wiring region of a touch substrate in the related art. As shown in FIG. 1, the touch substrate includes, in the wiring region, a base substrate 1, a black matrix 2, a planarization layer 3, a metallic layer 4, an inorganic layer 5, an organic layer 6 and a base substrate 7 arranged one on another. The base substrate 7 functions as a cover plate for encapsulating, and the metallic layer 4 includes a metallic wire. In FIG. 1, the metallic wire is merely covered by one inorganic layer 5 and one organic layer 6, so the touch substrate has insufficient resistance to moisture and oxygen. When the metallic wire is in the high-temperature high-humidity environment for a long time period, it may be corroded. As a result, the performance of the touch control product may be adversely affected, i.e., it is impossible for the touch control product to meet the requirements on the resistance to high temperature and high humidity.

In view of the above, a touch substrate, a method for manufacturing the same and a touch control device are provided according to embodiments of the present application, so as to enable the touch control product to operate in the high-temperature and high-humidity environment for a long time period.

Figure 7:
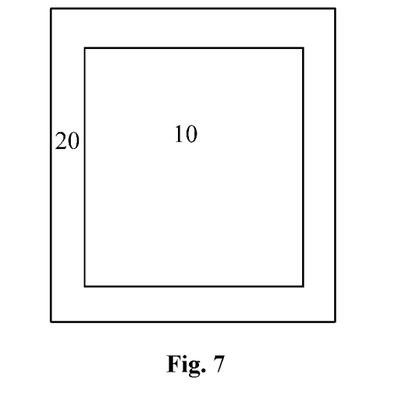
FIG. 7 is a schematic diagram showing a touch substrate according to some embodiments of the present disclosure.

The present disclosure provides in some embodiments a touch substrate which, as shown in FIG. 7, includes a touch region 10 and a wiring region 20 arranged adjacent to the touch region. The wiring region is covered by a protection structure, and the protection structure includes at least two organic layers and at least two inorganic layers arranged alternately one on another.

According to the embodiments, the wiring region is covered by the protection structure, and the protection structure includes a plurality of organic layers and a plurality of inorganic layers that are laminated alternately. As a result, the protection structure with the laminated design has excellent resistance to moisture and oxygen, and may protect metallic wires from being corroded in a high-temperature and high-humidity environment, thereby to enable a resultant touch control product to operate in the high-temperature and high-humidity environment for a long time period.

In some optional embodiments of the present disclosure, the protection structure may include two organic layers and two inorganic layers, i.e., a first organic layer, a first inorganic layer, a second organic layer and a second inorganic layer arranged one on another. Of course, the protection structure may also include more organic layers and more inorganic layers, e.g., three organic layers and three inorganic layers. The more the organic layers and the inorganic layers are, the better the resistance to moisture and oxygen is, the higher the manufacture cost of the touch substrate is, and meanwhile the larger the thickness of the touch substrate is. In actual application, the quantity of the organic layers and inorganic layers may be set according to the practical need.

In some optional embodiments of the present disclosure, each inorganic layer may have a refractive index of 1.60 to 1.75. In this way, when the touch region is covered by the inorganic layer, the refractive index of the inorganic layer may be close to that of a touch electrode, so the inorganic layer may serve as a shadow-eliminating layer.

In some optional embodiments of the present disclosure, each inorganic layer may be made of $SiN_xO_y$, $SiN_x$ or $SiO_y$. When the inorganic layer is made of $SiN_xO_y$, the first inorganic layer and the second inorganic layer may be formed in the wiring region through two $SiN_xO_y$ film-forming processes.

For a touch substrate in the related art, an inorganic layer made of $SiN_xO_y$ and covering the wiring region has a thickness of about 900 Å. Due to the relatively large thickness of $SiN_xO_y$, the inorganic layer made of $SiN_xO_y$ has a poor density and compactness. In some optional embodiments of the present disclosure, each inorganic layer may be thinned, e.g., each inorganic layer may have a thickness of 350 to 550 Å, so as to provide a better density and compactness, thereby to further improve the resistance to moisture and oxygen.

In some optional embodiments of the present disclosure, the organic layers and the inorganic layers may each be made of an insulation material. To be specific, each organic layer may be made of a transparent light-blocking material or a resin material, and have a thickness in a range of 10000 to 30000 Å.

Figure 2:
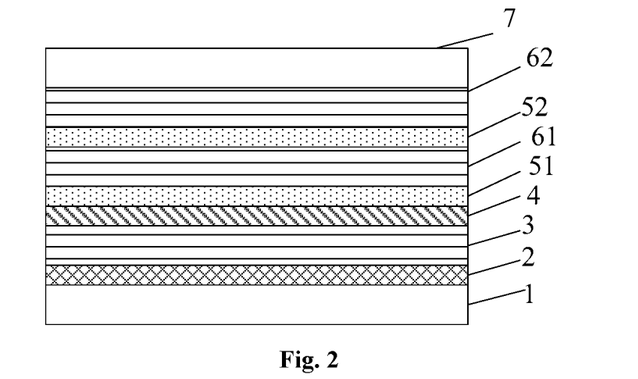
FIG. 2 is a schematic structural diagram showing a wiring region of a touch substrate according to some embodiments of the present disclosure.

In some optional embodiments of the present disclosure, the metallic wire may be arranged on a planarization layer 3, and two organic layers and two inorganic layers may be arranged alternately one on another on the metallic wire. As shown in FIG. 2, the touch substrate may include, in the wiring region: a base substrate 1; a black matrix 2 arranged on the base substrate 1; the planarization layer 3 arranged on the black matrix 2; the metallic wire (formed by a metallic layer 4) arranged on the planarization layer 3; the first inorganic layer 51 covering the metallic wire; the first organic layer 61 covering the first inorganic layer 51; the second inorganic layer 52 covering the first organic layer 61; and the second organic layer 62 covering the second inorganic layer 52.

Figure 3:
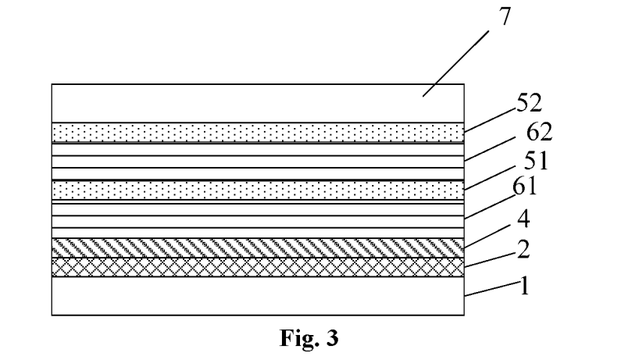
FIG. 3 is a schematic structural diagram showing a wiring region of a touch substrate according to some other embodiments of the present disclosure.

In some other optional embodiments of the present disclosure, the metallic wire may be directly arranged on the black matrix 2, and two organic layers and two inorganic layers may be alternately stacked on the metallic wire. As shown in FIG. 3, the touch substrate may include, in the wiring region: the base substrate 1; the black matrix 2 arranged on the base substrate 1; the metallic wire (formed by the metallic layer 4) arranged on the black matrix 2; the first organic layer 61 covering the metallic wire; the first inorganic layer 51 covering the first organic layer 61; the second organic layer 62 covering the first inorganic layer 51; and the second inorganic layer 52 covering the second organic layer 62.

In a direction from the base substrate 1 toward the layers stacked thereon, the protection structure may include the first organic layer, the first inorganic layer, the second organic layer and the second inorganic layer arranged in sequence one on another, or may include the first inorganic layer, the first organic layer, the second inorganic layer and the second organic layer arranged in sequence one on another. An arrangement mode of the layers of the protection structure on the base substrate may not be limited to those in FIGS. 2 and 3, as long as the plurality of organic layers and the plurality of inorganic layers are arranged alternately. For example, the organic layer of the protection structure may directly cover the metallic wire on the planarization layer 3, or the inorganic layer of the protection structure may directly cover the metallic wire on the black matrix 2.

Figure 4:
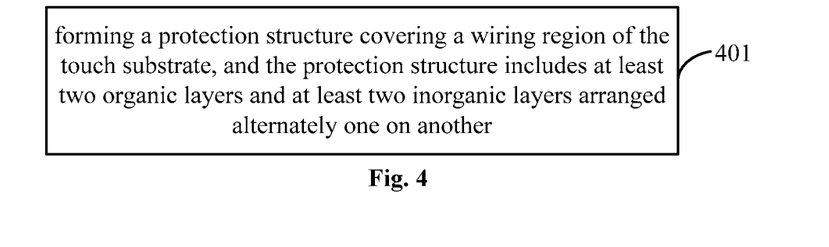
FIGS. 4-6 each is a flow chart of a method for manufacturing a touch substrate according to some embodiments of the present disclosure.

The present disclosure further provides in some embodiments a method for manufacturing a touch substrate. As shown in FIG. 4, the method includes step 401, forming a protection structure covering a wiring region of the touch substrate. The protection structure includes at least two organic layers and at least two inorganic layers arranged alternately one on another.

According to the embodiments, the wiring region is covered by the protection structure, and the protection structure includes a plurality of organic layers and a plurality of inorganic layers that are laminated alternately. In such a manner, the protection structure with the laminated design has excellent resistance to moisture and oxygen, and may protect metallic wires from being corroded in a high-temperature and high-humidity environment, thereby to enable a resultant touch control product to operate in the high-temperature and high-humidity environment for a long time period.

Figure 5:
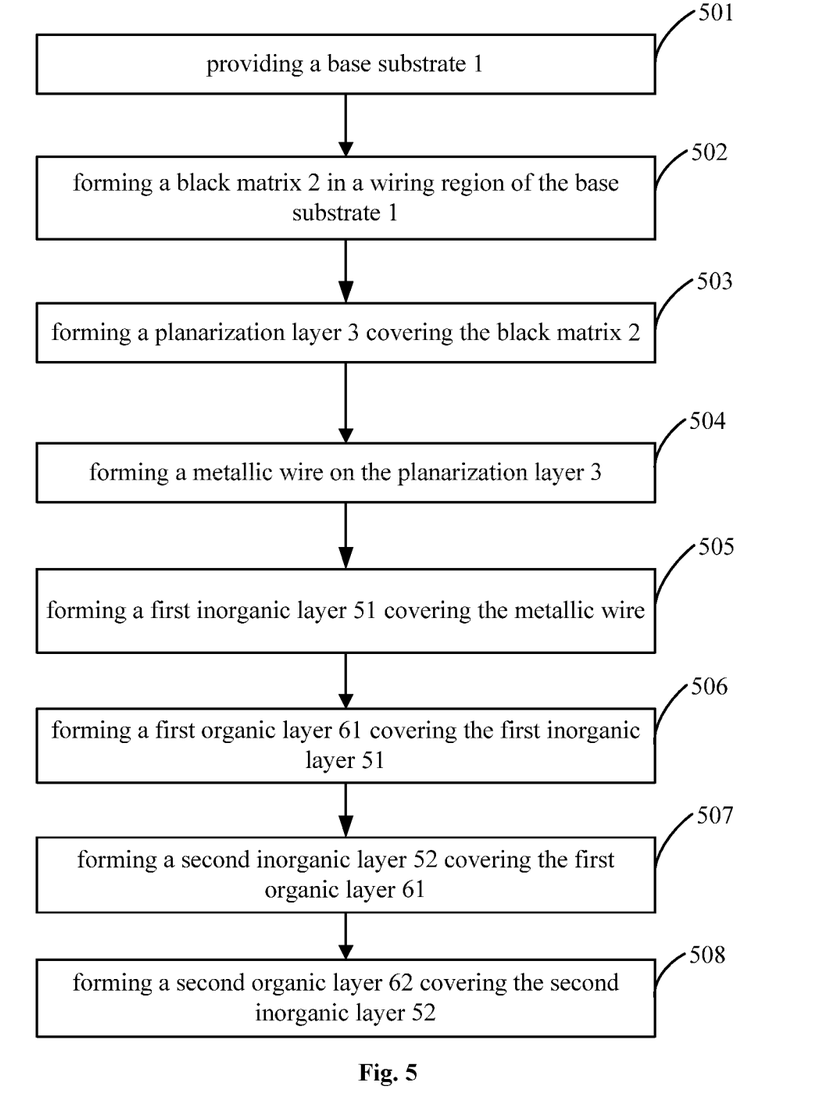

In some optional embodiments of the present disclosure, during the manufacture of the touch substrate in FIG. 2, as shown in FIG. 5, the method may include: step 501 of providing the base substrate 1; step 502 of forming the black matrix 2 in the wiring region of the base substrate 1; step 503 of forming the planarization layer 3 covering the black matrix 2; step 504 of forming the metallic wire (formed by the metallic layer 4) on the planarization layer 3; step 505 of forming the first inorganic layer 51 covering the metallic wire; step 506 of forming the first organic layer 61 covering the first inorganic layer 51; step 507 of forming the second inorganic layer 52 covering the first organic layer 61; and step 508 of forming the second organic layer 62 covering the second inorganic layer 52.

To be specific, the method may include the following steps A1 to A9.

In step A1, the base substrate 1 may be provided, which may be a glass substrate or a quartz substrate. Then, a black material layer may be formed on the base substrate 1, and patterned so as to form the black matrix 2 arranged in the wiring region of the touch substrate.

In step A2, a first transparent conductive layer may be deposited on the base substrate 1 acquired after step A1. The first transparent conductive layer may be made of indium tin oxide (ITO) or indium zinc oxide (IZO). Next, the first transparent conductive layer may be patterned. The patterning process includes: coating a photoresist onto the first transparent conductive layer; exposing and developing the photoresist through a mask plate to form a photoresist reserved region and a photoresist unreserved region; etching off the first transparent conductive layer at the photoresist unreserved region; and removing the photoresist at the photoresist reserved region may be removed, so as to form a bridge connecting touch electrodes. The bridge may be arranged at the touch region of the touch substrate.

In step A3, an insulation material layer may be deposited on the base substrate 1 acquired after step A2. To be specific, the insulation material layer may be made of resin, silicon nitride or silicon oxide. Next, the insulation material layer may be patterned, so as to form the planarization layer 3 arranged in the wiring region as well as an insulation pattern covering the bridge. Through the insulation pattern, it is able to insulate the bridge from the touch electrode.

In step A4, a second transparent conductive layer may be deposited on the base substrate 1 acquired after step A3. The second transparent conductive layer may be made of ITO or IZO. Next, the second transparent conductive layer may be patterned. To be specific, a photoresist may be coated onto the second transparent conductive layer, then exposed through a mask plate, and then developed so as to form a photoresist reserved region and a photoresist unreserved region. Then, the second transparent conductive layer at the photoresist unreserved region may be etched off, and the photoresist at the photoresist reserved region may be removed, so as to form a pattern of the touch electrode. The touch electrode may be arranged at the touch region of the touch substrate.

In step A5, the metallic layer 4 may be deposited on the base substrate 1 acquired after step A4, and then may be patterned. To be specific, a photoresist may be coated onto the metallic layer 4, then exposed through a mask plate, and then developed so as to form a photoresist reserved region and a photoresist unreserved region. Then, the metallic layer 4 at the photoresist unreserved region may be etched off, and the photoresist at the photoresist reserved region may be removed, so as to form the metallic wire on the planarization layer 3.

In step A6, the first inorganic layer 51 may be deposited on the base substrate 1 acquired after step A5. The first inorganic layer 51 may be made of $SiN_xO_y$, and may have a refractive index of 1.60 to 1.75 and a thickness of 350 to 550 Å. The first inorganic layer 51 may cover the touch region and the wiring region. A portion of the first inorganic layer 51 covering the wiring region may protect the metallic wire, and the other portion of the first inorganic layer 51 covering the touch region may be configured to eliminate a shadow. As compared with the $SiN_xO_y$ layer of the conventional touch substrate, the first inorganic layer 51 in the present disclosure has a smaller thickness, so it is able to provide a better density and compactness for the film made of $SiN_xO_y$, thereby to improve the resistance to moisture and oxygen.

In step A7, the first organic layer 61 may be formed on the base substrate 1 acquired after step A6. The first organic layer 61 may be arranged in the wiring region of the touch substrate, and it may be made of a transparent light-blocking material or a resin material.

In step A8, the second inorganic layer 52 may be deposited on the base substrate 1 acquired after step A7. The second inorganic layer 52 may be made of $SiN_xO_y$, and have a refractive index of 1.60 to 1.75 and a thickness of 350 to 550 Å. The second inorganic layer 52 may cover the touch region and the wiring region. A portion of the second inorganic layer 52 covering the wiring region may protect the metallic wire, and the other portion of the second inorganic layer 52 covering the touch region may be configured to eliminate a shadow. As compared with the $SiN_xO_y$ layer of the conventional touch substrate, the second inorganic layer 52 in the present disclosure has a smaller thickness, so it is able to provide a better density and compactness for the film made of $SiN_xO_y$, thereby to improve the resistance to moisture and oxygen.

In step A9, the second organic layer 62 may be formed on the base substrate 1 acquired after step A8. The second organic layer 62 may be arranged in the wiring region of the touch substrate, and it may be made of a transparent light-blocking material or a resin material.

Through the above steps A1 to A9, it is able to acquire the touch substrate in the embodiments. In some optional embodiments of the present disclosure, the base substrate 7 may also be provided on the base substrate 1 acquired after step A9, so as to function as an encapsulation cover plate. According to the embodiments, the wiring region is covered by the first inorganic layer 51, the first organic layer 61, the second inorganic layer 52 and the second organic layer 62 that are laminated in sequence. In such a manner, the protection structure with the laminated design has excellent resistance to moisture and oxygen, and may protect metallic wires from being corroded in a high-temperature and high-humidity environment, thereby to enable a resultant touch control product to operate in the high-temperature and high-humidity environment for a long time period.

Figure 6:
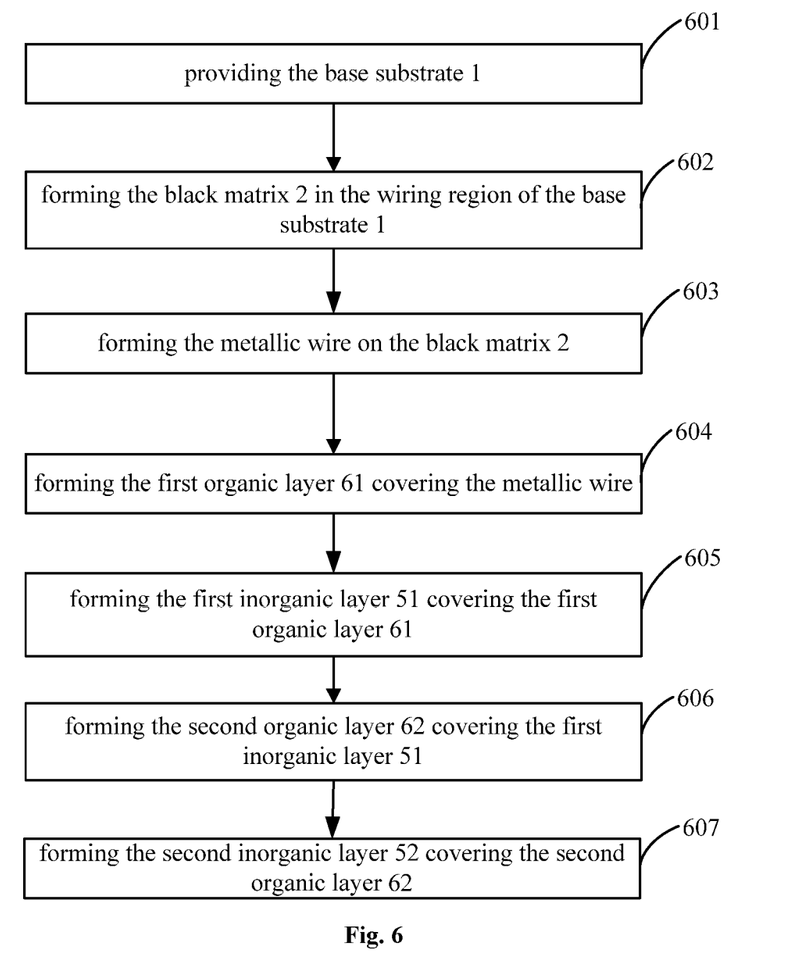

In some optional embodiments of the present disclosure, during the manufacture of the touch substrate in FIG. 3, as shown in FIG. 6, the method may include: step 601 of providing the base substrate 1; step 602 of forming the black matrix 2 in the wiring region of the base substrate 1; step 603 of forming the metallic wire (formed by the metallic layer 4) on the black matrix 2; step 604 of forming the first organic layer 61 covering the metallic wire; step 605 of forming the first inorganic layer 51 covering the first organic layer 61; step 606 of forming the second organic layer 62 covering the first inorganic layer 51; and step 607 of forming the second inorganic layer 52 covering the second organic layer 62.

To be specific, the method may include the following steps B1 to B9.

In step B1, the base substrate 1, e.g., a glass substrate or a quartz substrate, may be provided. Then, a black material layer may be formed on the base substrate 1, and patterned so as to form the black matrix 2 arranged in the wiring region of the touch substrate.

In step B2, the metallic layer 4 may be deposited on the base substrate 1 acquired after step B 1, and then patterned. To be specific, a photoresist may be coated onto the metallic layer 4, then exposed through a mask plate, and then developed so as to form a photoresist reserved region and a photoresist unreserved region. Then, the metallic layer 4 at the photoresist unreserved region may be etched off, and the photoresist at the photoresist reserved region may be removed, so as to form the metallic wire on the black matrix 2. Further, an alignment mark for the subsequent process may also be formed through the metallic layer 4.

In step B3, a first transparent conductive layer may be deposited on the base substrate 1 acquired after step B2. The first transparent conductive layer may be made of ITO or IZO. Next, the first transparent conductive layer may be patterned. To be specific, a photoresist may be applied onto the first transparent conductive layer, then exposed through a mask plate, and then developed so as to form a photoresist reserved region and a photoresist unreserved region. Then, the first transparent conductive layer at the photoresist unreserved region may be etched off, and the photoresist at the photoresist reserved region may be removed, so as to form a bridge connecting touch electrodes. The bridge may be arranged at the touch region of the touch substrate.

In step B4, the first organic layer 61 may be formed on the base substrate 1 acquired after step B3. The first organic layer 61 may include a portion arranged in the wiring region of the touch substrate and a portion arranged at the touch region of the touch substrate. The portion of the first organic layer 61 in the wiring region may cover the metallic wire, and the portion of the first organic layer 61 at the touch region may be arranged on a bridge connecting the touch electrodes so as to isolate the bridge from the touch electrodes. The first organic layer 61 may be made of a resin material.

In step B5, a second transparent conductive layer may be deposited on the base substrate 1 acquired after step B4. The second transparent conductive layer may be made of ITO or IZO. Next, the second transparent conductive layer may be patterned. To be specific, a photoresist may be applied onto the second transparent conductive layer, then exposed through a mask plate, and then developed so as to form a photoresist reserved region and a photoresist unreserved region. Then, the second transparent conductive layer at the photoresist unreserved region may be etched off, and the photoresist at the photoresist reserved region may be removed, so as to form a pattern of the touch electrode. The touch electrode may be arranged at the touch region of the touch substrate.

In step B6, the first inorganic layer 51 may be deposited on the base substrate 1 acquired after step B5. The first inorganic layer 51 may be made of $SiN_xO_y$, and have a refractive index of 1.60 to 1.75 and a thickness of 350 to 550 Å. The first inorganic layer 51 may cover the touch region and the wiring region. A portion of the first inorganic layer 51 covering the wiring region may protect the metallic wire, and the other portion of the first inorganic layer 51 covering the touch region may be configured to eliminate a shadow. As compared with the $SiN_xO_y$ layer of the conventional touch substrate, the first inorganic layer 51 in the present disclosure has a smaller thickness, so it is able to provide a better density and compactness for the film made of $SiN_xO_y$, thereby to improve the resistance to moisture and oxygen.

In step B7, the second organic layer 62 may be formed on the base substrate 1 acquired after step B6. The second organic layer 62 may be arranged in the wiring region of the touch substrate, and it may be made of a resin material.

In step B8, the second inorganic layer 52 may be deposited on the base substrate 1 acquired after step B7. The second inorganic layer 52 may be made of $SiN_xO_y$, and have a refractive index of 1.60 to 1.75 and a thickness of 350 to 550 Å. The second inorganic layer 52 may cover the touch region and the wiring region. A portion of the second inorganic layer 52 covering the wiring region may protect the metallic wire, and the other portion of the second inorganic layer 52 covering the touch region may function as a varnishing layer. As compared with the $SiN_xO_y$ layer of the conventional touch substrate, the second inorganic layer 52 in the embodiments has a smaller thickness, so it is able to provide a better density and compactness for the film made of $SiN_xO_y$, thereby to improve the resistance to moisture and oxygen.

Through the above steps B1 to B8, it is able to acquire the touch substrate in the embodiments. In some optional embodiments of the present disclosure, the base substrate 7 may also be provided on the base substrate 1 acquired after step B8, so as to function as an encapsulation cover plate. According to the embodiments of the present disclosure, the wiring region is covered by the first organic layer 61, the first inorganic layer 51, the second organic layer 62 and the second inorganic layer 52 that are laminated in sequence. In such a manner, the protection structure with the laminated design has excellent resistance to moisture and oxygen, and may protect metallic wires from being corroded in a high-temperature and high-humidity environment, thereby to enable a resultant touch control product to operate in the high-temperature and high-humidity environment for a long time period.

The present disclosure further provides in some embodiments a touch control device including the above-mentioned touch substrate. According to the embodiments of the present disclosure, it is able to provide the touch control device with excellent resistance to moisture and oxygen, and protect the metallic wire from being corroded in a high-temperature high-humidity environment, thereby to enable the touch control device to operate in the high-temperature and high-humidity environment for a long time period. Therefore, the touch control device may be applied in a vehicle-mounted technology, that is, the touch substrate may be a vehicle-mounted touch control device.

In the embodiments of the present disclosure, numbering of the steps does not necessarily define a sequence of the steps. Variation of the sequence of the steps also falls into the protection scope of the present disclosure for one of ordinary skills in the art on the premise of paying not creative work.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", or "comprising" and the like mean that an element or an article preceding the term contains elements or items and equivalents thereof behind the term, but does not exclude other elements or items. Such terms as "connect", or "interconnected" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It may be understood that when an element such as a layer, a film, a region or a substrate is referred to as being "on" or "under" another element, the element may be "directly" "on" or "under" the another element, or there may exist an intervening element.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A touch substrate, comprising:
   a touch region; and
   a wiring region arranged adjacent to the touch region and covered by a protection structure,
   wherein the protection structure comprises at least two organic layers and at least two inorganic layers arranged alternately one on another,
   wherein each inorganic layer is made of $SiN_xO_y$, x and y each being a positive integer and each inorganic layer has a thickness ranging from 350 to 550 Å, and
   wherein the at least two inorganic layers of the protection structure covers a touch electrode in the touch region, one of the at least two inorganic layers directly contacts the touch electrode, and each inorganic layer has a refractive index ranging from 1.60 to 1.75.

2. The touch substrate according to claim 1, wherein the protection structure comprises a first organic layer, a first inorganic layer, a second organic layer and a second inorganic layer that are sequentially arranged one on another.

3. The touch substrate according to claim 2, wherein the touch substrate comprises, in the wiring region:
   a planarization layer;
   a metallic wire arranged on the planarization layer;
   the first inorganic layer covering the metallic wire;
   the first organic layer covering the first inorganic layer;
   the second inorganic layer covering the first organic layer; and
   the second organic layer covering the second inorganic layer.

4. The touch substrate according to claim 2, wherein the touch substrate comprises, in the wiring region:
   a metallic wire;
   the first organic layer covering the metallic wire;
   the first inorganic layer covering the first organic layer;
   the second organic layer covering the first inorganic layer; and
   the second inorganic layer covering the second organic layer.

5. The touch substrate according to claim 2, wherein the first inorganic layer and the second inorganic layer are made of a same material, and the first organic layer and the second organic layer are made of a same material.

6. The touch substrate according to claim 1, wherein each organic layer is made of a transparent material.

7. The touch substrate according to claim 6, wherein each organic layer has a thickness ranging from 10000 to 30000 Å.

8. A method for manufacturing a touch substrate, comprising:
   forming a protection structure covering a wiring region of the touch substrate, wherein the protection structure comprises at least two organic layers and at least two inorganic layers arranged alternately one on another,
   wherein the forming the at least two inorganic layers comprises:
   forming each of the at least two inorganic layers by using $SiN_xO_y$, to enable a thickness of each inorganic layer to be in a range of 350 to 550 Å, and a refractive index of each inorganic layer to be in a range of 1.60 to 1.75, x and y each being a positive integer.

9. The method according to claim 8, wherein the forming the protection structure comprises: forming a first organic layer, a first inorganic layer, a second organic layer and a second inorganic layer sequentially in the wiring region.

10. The method according to claim 9, further comprising:
    forming a planarization layer;
    forming a metallic wire on the planarization layer;
    forming the first inorganic layer covering the metallic wire;
    forming the first organic layer covering the first inorganic layer;
    forming the second inorganic layer covering the first organic layer; and
    forming the second organic layer covering the second inorganic layer.

11. The method according to claim 9, further comprising:
    forming a metallic wire;
    forming the first organic layer covering the metallic wire;
    forming the first inorganic layer covering the first organic layer;
    forming the second organic layer covering the first inorganic layer; and
    forming the second inorganic layer covering the second organic layer.

12. A touch control device, comprising the touch substrate according to claim 1.

13. The touch control device according to claim 12, wherein the touch control device is a vehicle-mounted touch control device.

14. The method according to claim 8, wherein the forming the protection structure comprises:
   forming the at least two organic layers by using a same material, and forming the at least two inorganic layers by using another same material.

15. The method according to claim 14, wherein the forming the at least two organic layers comprises:
   forming each of the at least two organic layers by using a transparent material, to enable a thickness of each organic layer to be in a range of 10000 to 30000 Å.

16. A touch substrate, comprising:
   a touch region; and
   a wiring region arranged adjacent to the touch region and covered by a protection structure,
   wherein the protection structure comprises at least two organic layers and at least two inorganic layers arranged alternately one on another,
   wherein the protection structure comprises a first organic layer, a first inorganic layer, a second organic layer and a second inorganic layer that are sequentially arranged one on another, and
   wherein the touch substrate comprises, in the wiring region:
   a base substrate;
   a black matrix on the base substrate;
   a metallic wire on the black matrix, wherein the metallic wire directly contacts with the black matrix;
   the first organic layer covering the metallic wire;
   the first inorganic layer covering the first organic layer;
   the second organic layer covering the first inorganic layer; and
   the second inorganic layer covering the second organic layer.

* * * * *

UNITED STATES PATENT AND TRADEMARK OFFICE
CERTIFICATE OF CORRECTION

| | | |
|---|---|---|
| PATENT NO. | : 10,891,009 B2 | Page 1 of 1 |
| APPLICATION NO. | : 16/331801 | |
| DATED | : January 12, 2021 | |
| INVENTOR(S) | : Ting Zeng et al. | |

It is certified that error appears in the above-identified patent and that said Letters Patent is hereby corrected as shown below:

On the Title Page

Delete:
"(73) Assignee: BOE TECHNOLOGY GROUP CO., LTD."
And Insert:
--(73) Assignee: HEFEI XINSHENG OPTOELECTRONICS TECHNOLOGY CO., LTD., Hefei, Anhui, (CN); BOE TECHNOLOGY GROUP CO., LTD., Beijing (CN)--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*